Nov. 25, 1958     B. R. SILVER     2,861,317
ORNAMENTAL SNAP FASTENER ASSEMBLY
Filed Sept. 29, 1955
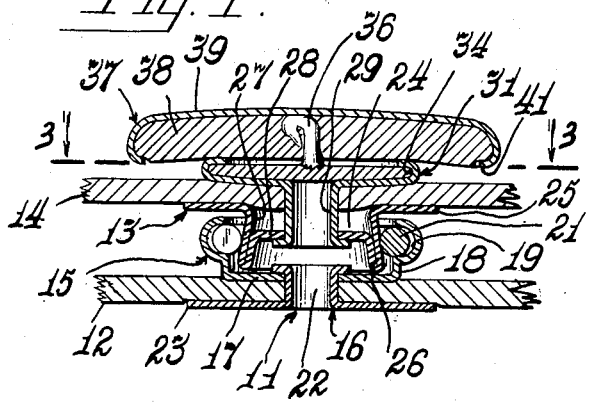
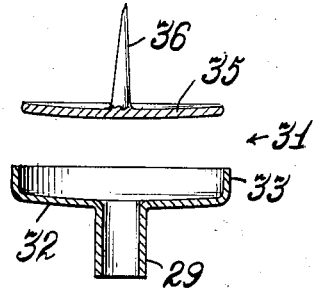
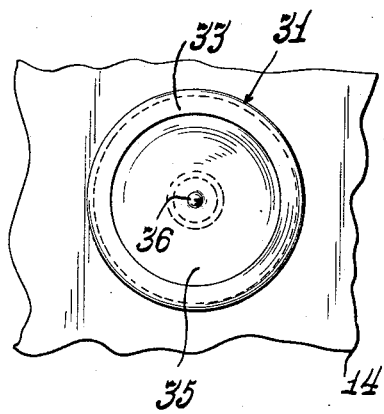
INVENTOR.
BERNARD R. SILVER
BY
ATT'Y United States Patent Office 2,861,317
Patented Nov. 25, 1958

2,861,317

ORNAMENTAL SNAP FASTENER ASSEMBLY

Bernard R. Silver, Providence, R. I., assignor to Rau Fastener Company, Providence, R. I., a corporation of Rhode Island Application September 29, 1955, Serial No. 537,486

7 Claims. (Cl. 24—216)

The present invention relates to improvements in ornamental snap fastener assemblies adapted for use particularly on wearing apparel and, more specifically, the invention resides in the novel construction and assemblage of elements whereby an ornamental front button or cap, may be easily or quickly joined in an assemblage of snap fastener parts.

Ornamental snap fastener assemblies generally include a front or button part that is peripherally engaged over a correspondingly shaped flange or rim on a complemental fastener part. Such assemblies usually require that the parts be critically dimensioned to prevent unwanted separation or that the button part conforms in its contour to the contour of the part to which it is attached and further, the use of special attaching machines or tools often is required to assemble the parts. Other known assemblies require the use of specially formed interlocking parts on the complementally attached elements with the consequence that only elements having such interlocking parts can be joined thus limiting and restricting the adaptability and utility of the assemblage.

The assembly of the present invention overcomes all known objectionable characteristics of the several types of assemblies referred to and it consists essentially of a snap fastener assembly of a kind having complemental members mounted firmly in two supporting sheets, such as complemental garment portions, and means embodied in one snap fastener member to facilitate the easy and quick attachment thereto of an ornamental front or cap of any desired practical size, configuration or material. Specifically, one of the fastener members includes as an integrally assembled part thereof a headed pin or tack that projects outwardly from one surface of the sheet material, which pin or tack is embedded in the body or material of an ornamental front or cap of any desired size or configuration and then clinched preferably so as to prevent its separation therefrom.

It is, therefore, an object of the present invention to provide an ornamental snap fastener assembly of the aforementioned character which is comparatively simple in construction, durable, compact, attractive in appearance and which may be manufactured and assembled at low cost.

Another object of the invention is to provide a snap fastener assembly, including a snap fastener member and an ornamental front member, with novel means for connecting said members to each other and to a supporting sheet.

Another object is to provide, in association with a snap fastener part, a novelly constructed element for securing the fastener member to a supporting sheet and for retaining an ornamental front member or button in place on said supporting sheet so as to conceal the fastener assembly.

Another object is to provide a novelly constructed combination snap fastener mounting eyelet or connector and mounting for a fastener cap or ornamental front.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, I have illustrated in the accompanying drawings a preferred embodiment thereof, from an inspection of which, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a view, in vertical section, showing the elements of the ornamental front snap fastener assembly connected together.

Fig. 2 is an exploded view of the mounting connector for the fastener member and ornamental front or cap.

Fig. 3 is a view taken substantially on line 3—3 of Fig. 1.

Referring to the accompanying drawings, the snap fastener assembly illustrated includes a female member assembly 11 that is mounted on a supporting sheet 12 and a male member assembly 13 that is mounted on a complemental supporting sheet 14. As is well understood in the art, the supporting sheets 12 and 14 may consist of complemental portions of a garment or other article, which portions are detachably joined when the male and female assemblies are connected as illustrated in Fig. 1.

The female member assembly 11 consists essentially of a socket part 15 and a tubular connector 16. The socket part which is seated on one face of the sheet 12 comprises a base wall 17 having an upstanding peripheral wall 18 provided with an internal circumferential channel 19 to receive a split ring 21. The base wall 17 is axially apertured to receive the tubular connector post 22 formed on the tubular connector 16. Said post projects from one face of a disk portion 23 which is arranged against the face of the supporting sheet 12 opposite to that upon which the socket part 15 is arranged. As shown, the post 22 extends through the supporting sheet 12 and is clenched over the inside face of the base wall 17 of the socket part 15 to thereby secure the two parts together and to the supporting sheet.

The male member assembly 13 consists essentially of a male part 24 having a base flange 25 that is seated against or upon one face of the supporting sheet 14. Projecting outwardly from the base flange 25 is a circumferential rim 26 defining a stud having a neck portion 27 of progressively reduced diameter so as to adapt the stud for frictional engagement with the split ring 21 of the female member assembly when the parts are assembled detachably in the manner illustrated in Fig. 1. The end wall 28 of the stud 26 is recessed, as illustrated, and it is adapted to receive through an axial opening therein a tubular post 29 of a mounting assembly generally indicated at 31. This mounting assembly includes a portion 32 that is integral with tubular post 29 and which is seated against the face of the supporting sheet 14 opposite to the face upon which the male part 24 is seated. When so positioned, its tubular post 29 projects through an aperture in the supporting sheet and is clinched or otherwise secured over the recessed wall 28 through which it also extends.

The mounting assembly disc portion 32 has a peripheral flange 33 extending in a direction opposed to the direction in which the tubular post 29 extends and said flange is adapted to be turned inwardly radially to provide an internal peripheral channel 34 within which is received the periphery of the head or flange 35 of a flanged pin assembly that includes an upstanding pin or tack 36. It should be observed that the flanged pin assembly is permanently attached to and forms an integral part of the disc portion 32 which, in turn, is fixedly secured to the supporting sheet 14 and to the male member assembly 13. The male member assembly 13 carried on the supporting sheet 14 may be easily and quickly attached to or separated from the female member assembly 11 in a manner well known in the industry.

An ornamental front or cap 37 is adapted to be secured in place over the snap fastener assembly and said member may consist of a body 38 of suitable material such as wood, fiber, plastic or the like and which may be covered by a suitable ornamental covering 39 of any acceptable sheet material such as for example sheet metal, plastic or fabric. The covering 39 may be secured to the body 38 in any suitable manner, however, it is preferred in the instance of a metal or other shape retaining covering that its peripheral edge be rolled downwardly and under the peripheral margin of the body 38 as shown at 41. When the front or cap part 37 is placed over a flanged pin assembly, the pin 36 pentrates the body 38 and preferably is clenched or otherwise deformed as illustrated to prevent separation of the assembled parts.

Obviously the snap fastener assembly illustrated, or any comparable assembly capable of including as a part thereof the deformable pin assembly 31, may have associated with it an ornamental cap or front member of any desired configuration, size or shape and/or any suitable material and when such front member or cap is secured in place its separation from the assembly is effectively prevented. The present construction affords means whereby ornamental fronts or cap members may be easily and quickly applied to a fastener assembly without the previous requisite that the front member or cap have complemental portions adapted for frictional binding engagement with means provided to receive the same on the fastener assembly. It should be understood also that other types of fastener assemblies may be incorporated and used in association with the flanged deformable pin assembly and ornamental front member or cap so long as at least the member attached to the flanged pin assembly is apertured to receive therethrough the tubular connector of the assembly.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. An ornamental snap fastener assembly comprising, a female member for mounting on a supporting sheet, said female member including an eyelet on one side of the sheet and comprising a disc portion having a tubular connector projecting through the sheet and a socket part on the other side of said sheet fixed on the projecting end portion of the tubular connector, a male member for mounting on another supporting sheet, said male member including a male part on one side of said other sheet adapted to detachably engage in the socket part and a mounting for an ornamental front on the other side of said other sheet and comprising a disc portion having a tubular connector projecting through the said other sheet and fixed in the said male part, a flanged deformable pin seated on said last named disc portion, said last named disc portion having a peripheral inturned flange overlying the peripheral margin of the pin flange, and an ornamental fastener front overlying said flanged disc portion and secured thereto by said flanged pin.

2. An ornamental snap fastener assembly of the character recited in claim 1 in which the flanged pin is embedded within the fastener front.

3. An ornamental snap fastener assembly of the character recited in claim 1 in which the flanged pin is embedded and crimped within the fastener front.

4. An ornamental snap fastener comprising a fastener member for mounting on a supporting sheet, said fastener member including an eyelet on one side of the sheet and comprising a disc portion having a tubular connector projecting through the sheet and a fastener part on the other side of said sheet fixed on the projecting end portion of the tubular connector, a complemental fastener member for mounting on another supporting sheet, said complemental member including a fastener part on one side of said other sheet adapted to detachably engage the first named fastener part and a mounting for an ornamental front on the other side of said other sheet and comprising a disc portion having a tubular connector projecting through the said other sheet and fixed in the said complemental fastener part, a flanged deformable pin seated on said last named disc portion, said last named disc portion having a peripheral inturned flange overlying the peripheral margin of the pin flange, and an ornamental fastener front overlying said flanged disc portion and secured thereto by said flanged pin.

5. An ornamental snap fastener assembly comprising, a fastener member for mounting on a supporting sheet, a complemental fastener member for mounting on another supporting sheet, said complemental fastener member including a fastener part on one side of said other sheet adapted to detachably engage the first named fastener member and a mounting for an ornamental front on the other side of said other sheet and comprising a disc portion having a tubular connector projecting through the said other sheet and fixed in the said complemental fastener part, a flanged pin seated on said disc portion, said disc portion having a peripheral inwardly opening channel to receive the flange on the pin, and an ornamental front overlying said disc portion and secured thereto by said flanged pin.

6. An ornamental snap fastener assembly comprising a fastener member for mounting on a supporting sheet, a complemental fastener member for mounting on another supporting sheet, said complemental fastener member including a fastener part on one side of said other sheet adapted to detachably engage the first named fastener member and a mounting for an ornamental front on the other side of said other sheet and comprising a disc portion having a perpendicular extension projecting through the said other sheet and fixed in the said complemental fastener part, a flanged pin seated on said disc portion, a peripheral inwardly opening channel on said disc portion to receive the flange on the pin, and an ornamental front overlying said disc portion and secured thereto by said flanged pin.

7. An ornamental snap fastener assembly comprising a fastener member for mounting on a supporting sheet, a complemental fastener member for mounting on another supporting sheet, said complemental fastener member including a fastener part on one side of said other sheet adapted to detachably engage the first named fastener member and a mounting for an ornamental front on the other side of said other sheet and comprising a plate portion seated on said other sheet and having a perpendicular extension projecting through said other sheet and fixed in said complemental fastener part, a flanged pin seated on said plate portion, means on said plate portion to secure the flange firmly thereto, and an ornamental front overlying said plate portion and secured thereto by said flanged pin.

References Cited in the file of this patent

UNITED STATES PATENTS

| | | |
|---|---|---|
| 274,316 | Hall | Mar. 20, 1883 |
| 496,357 | Hall | Apr. 25, 1893 |
| 1,227,124 | Edelson | May 22, 1917 |
| 1,234,359 | McCormack | July 24, 1917 |
| 1,664,582 | Waldes | Apr. 3, 1928 |
| 2,606,353 | Huelster | Aug. 12, 1952 |

FOREIGN PATENTS

| | | |
|---|---|---|
| 482,451 | France | Dec. 28, 1916 |
| 535,256 | Great Britain | Apr. 3, 1941 |